Patented Sept. 2, 1941

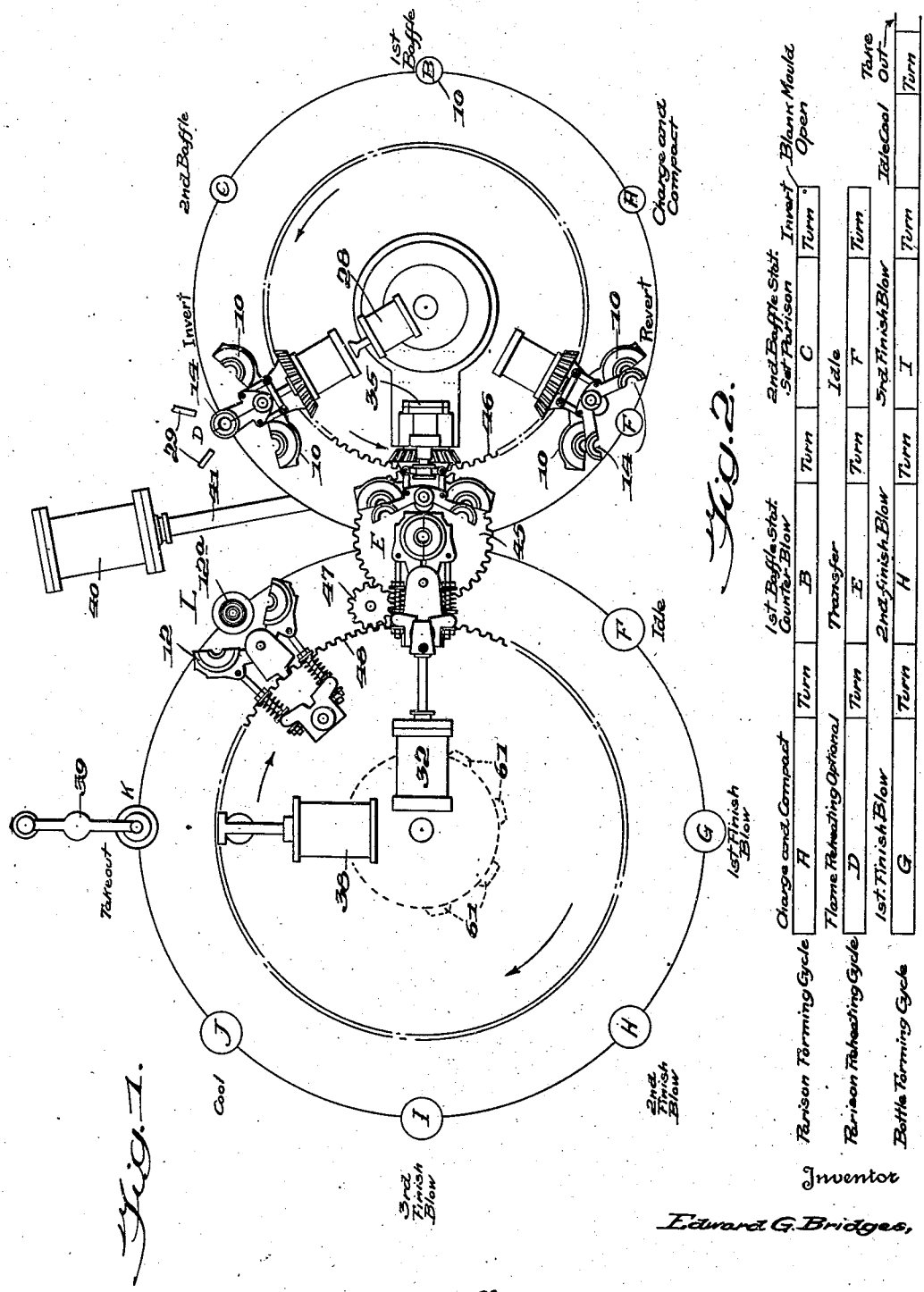

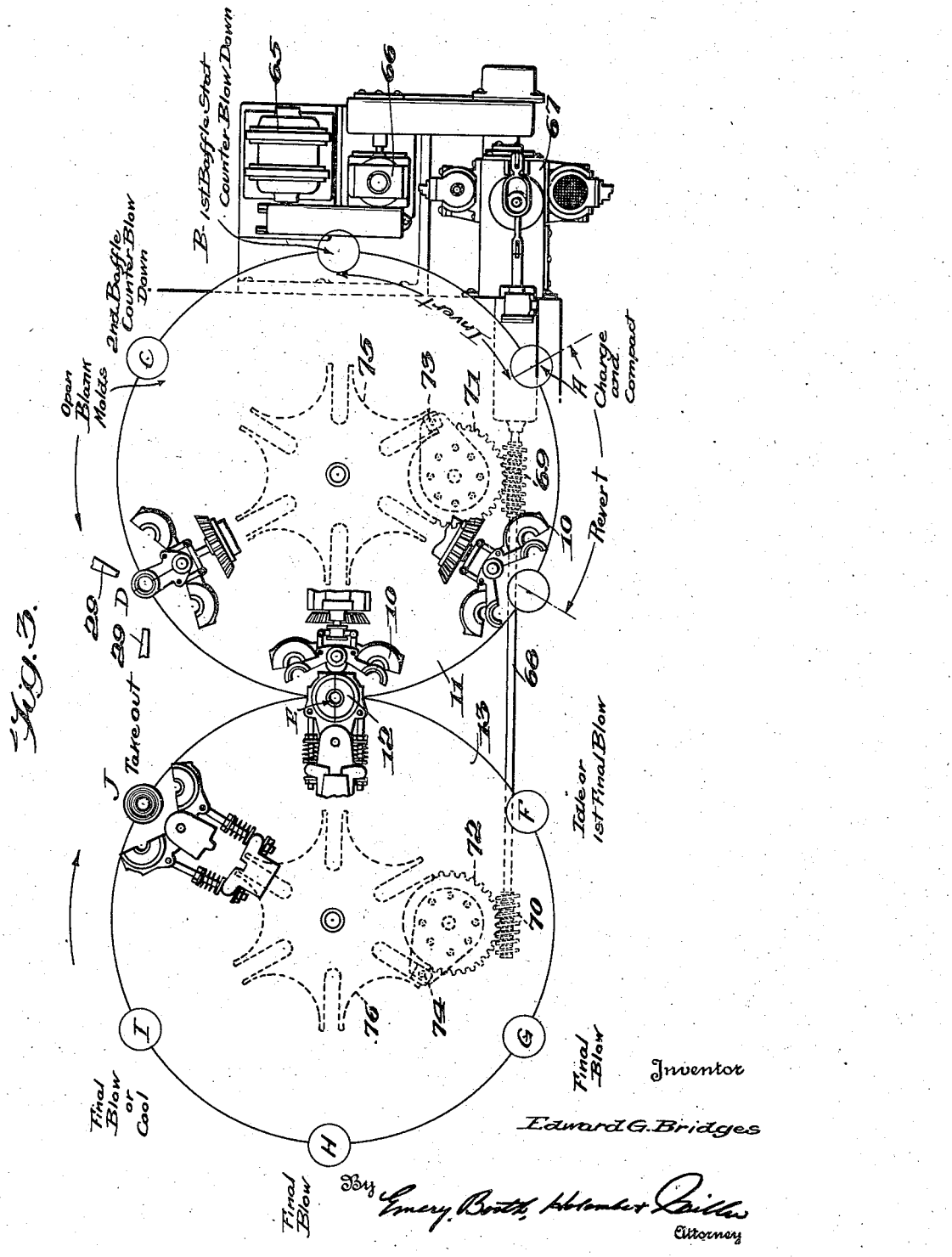

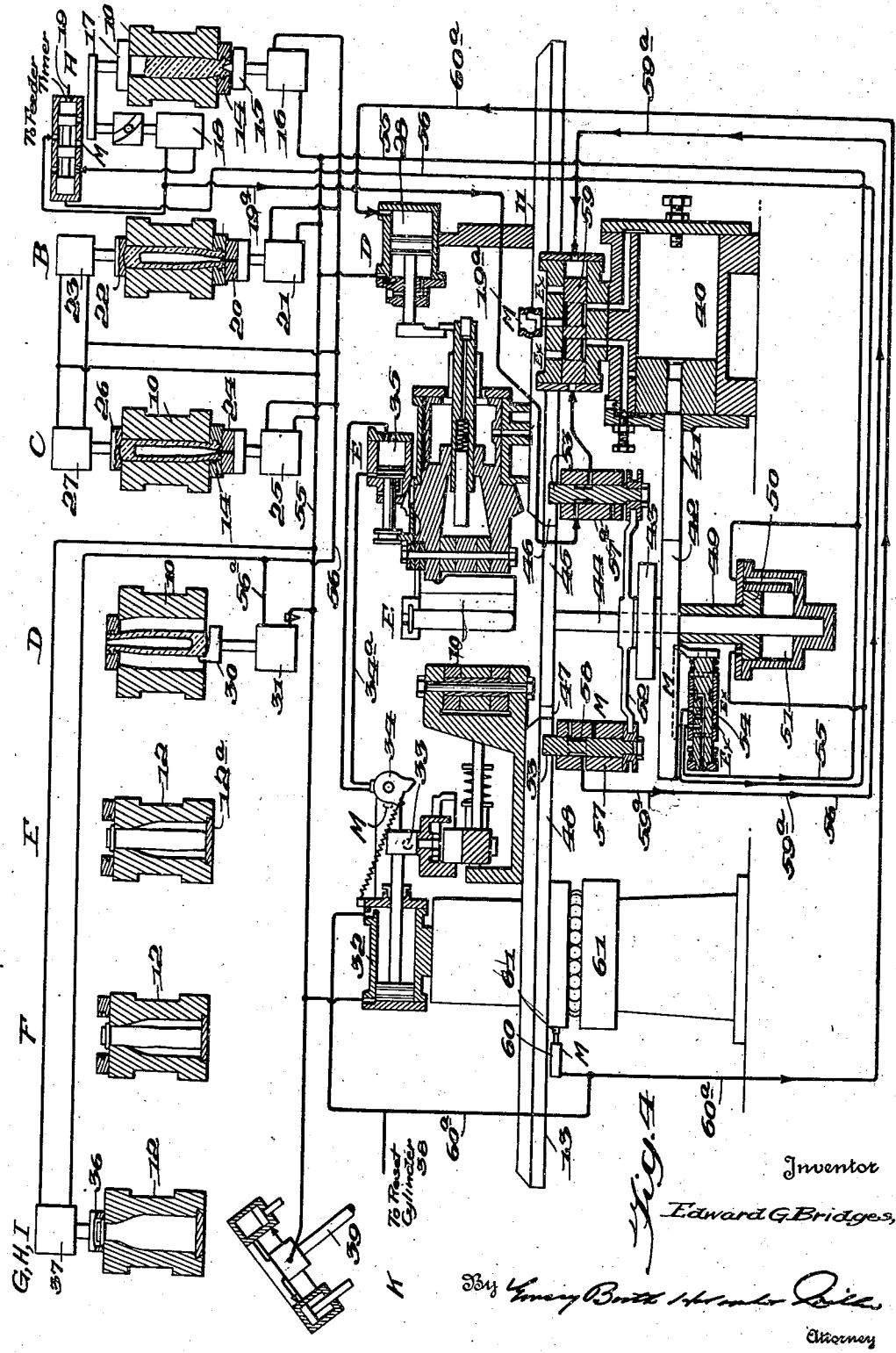

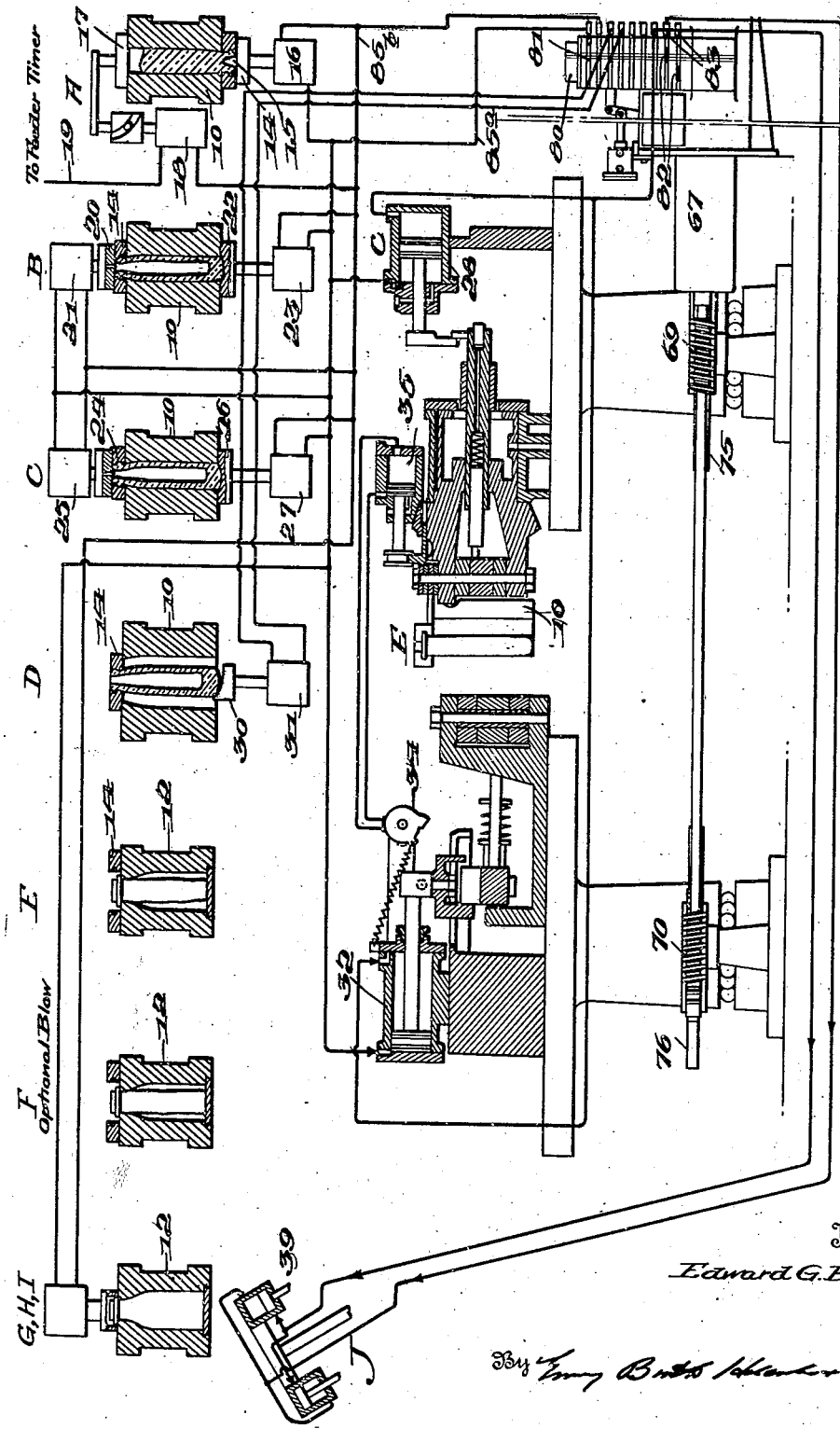

2,254,992

UNITED STATES PATENT OFFICE 2,254,992

MACHINE FOR AND METHOD OF FORMING HOLLOW GLASSWARE

Edward G. Bridges, Anderson, Ind., assignor to Lynch Corporation, Anderson, Ind., a corporation of Indiana Application November 30, 1927, Serial No. 177,335

6 Claims. (Cl. 49—9)

The present invention relates to glassware manufacture and more particularly to an improved method and apparatus of forming hollow glass articles such as bottles, jars and the like.

More specifically the invention aims to improve the method and apparatus disclosed in my prior Patent No. 2,069,130, enabling many types of bottles and jars to be produced at a higher speed than is possible with the machine and method of the above mentioned patent.

The improved method, according to the invention is advantageously carried out by a machine of the general type shown in my patent above referred to, by increasing the length and duration of parison forming cycle and additionally setting or cooling the glass in the parison after it has been blown to hollow form, and also in increasing the duration of the parison reheating period, so that the chilled skin or enamel in the parison will be sufficiently reheated when it arrives at the final blowing position to be uniformly expanded by air pressure into a finished bottle.

In order to illustrate the invention, reference may be had to the accompanying drawings in which—

Fig. 1 is a diagrammatic plan view illustrating one manner of practicing the invention on a two-table bottle forming machine having six blank molds and eight blow molds;

Fig. 2 is a diagrammatic view illustrating the timing cycle of the machine and method;

Fig. 3 is a similar view illustrating one manner of practicing the invention on a two-table machine having six blank molds and six blow molds;

Fig. 4 is a diagrammatic view illustrating the steps of fabricating the glass as well as the timing connection for operating the fabricating device of the machine shown in Fig. 1; and Fig. 5 is a similar view illustrating the steps of fabricating the glass as well as the timing connections for operating the fabricating devices of the machine shown in Fig. 2.

The invention is advantageously embodied in and practiced on a machine having a plurality of invertible blank molds 10 on one rotatable table or carrier 11 and a plurality of blow molds 12 on a laterally spaced rotatable table or carrier 13.

The machine illustrated in Figs. 1 and 3 advantageously may have six (6) blank molds 10, and eight (8) blow molds 12, and advantageously may be pneumatically driven so as to intermittently be rotated to present the blank molds successively to fixed operating positions A, B, C, D and E, and the blow molds successively to fixed positions E, F, G, H, I, J and K.

At the position A the blank mold 10 with the associated neck molds 14 is inverted, that is, the neck end is lowermost and is cooperatively positioned with a mouthforming pin 15 actuated by a pneumatic motor 16 adapted to close the mouth or neck end of the mold. A charge of glass is delivered into the upper open end of the mold at position A, following which a blow head 17 is applied to the upper open end of the mold to admit air under pressure to the charge of glass and compact it around the mouthforming pin to form the neck or mouth end of the bottle. Preferably the blowhead 17 is moved into position to close the mold by means of a pneumatic motor 18 (Fig. 4) actuated by air through line 19 from the feeder timer (not shown) so that the blowhead 17 is moved to operative position immediately following and in synchronism with the delivery of the charge of glass to the blank mold.

Following the compacting of the glass charge in the blank mold and the release of the mouthforming pin 15 and blowhead 17 from engagement with the mold, the carrier 11 is indexed to bring the aforementioned mold to position B where the compacted charge is blown to hollow form to produce a blown parison of predetermined length, this operation being termed "counterblowing." Preferably the counterblowing is effected while the blank mold is still inverted, as the upward counterblowing will not weaken the shoulders to the same extent as is the case when counterblowing is downward.

The counterblowing air may be supplied to the mouth end of the parison by means of a blowhead 20 below the mold and movable into engagement with the neck end of the mold by means of a pneumatic motor 21. During this counterblowing operation the upper end of the mold 10 is advantageously closed, as by means of a baffle plate 22 movable into engagement with the upper end of the mold by means of a pneumatic motor 23, so as to confine the charge in the mold during counterblowing, producing a blown parison of predetermined length and form.

The above described steps of compacting and subsequently counterblowing the parison while confined in the parison mold are the usual steps employed in a rotary gob-fed bottle-forming machine. Usually these steps comprise the whole parison forming cycle and immediately following counterblowing the parison is transferred to a blow or finishing mold, where for a time it is permitted to reheat and thus is blown to finished form.

Instead of immediately transferring the counterblown parison to a finishing mold, as is the usual practice, I additionally cool and set the glass parison by again subjecting the interior thereof to air pressure while the parison is confined in the same mold 10. This is advantageously accomplished at position C, at which position there is a blowhead 24 actuated by a pneumatic motor 25 below the mold like the blowhead 20 and motor 21, and a second baffle plate 26 and motor 27 like the baffle 22 and motor 23. During this second baffle or parison blowing position the glass is additionally cooled or set by being forced against the cooler metal mold.

Following the second counterblowing operation the mold with the blown parison in it is moved from position C to D, and during said movement the mold is inverted by the usual inverting mechanism to neck end up position. Upon arrival at this station D, the blank mold is opened by means of a pneumatic motor 28 to expose the blown parison hanging from its neck end, so as to permit the reheating of the parison to commence.

The reheating cycle of the parison is in effect an idle period during which the hot glass in the interior of the parison may reheat the chilled skin or enamel on the outer surface and thus prepare the parison for subsequent final blowing. Advantageously the reheating cycle of the machine should equal in duration the parison forming time so that the glass walls of the parison may be of uniform temperature permitting a uniform expansion when subjected to final blowing air pressure. Inasmuch as the glass has been subjected to the cooling action of the mold at three successive operating positions, i. e. A, B, and C, I preferably permit an equal duration of reheating time at D, E, and F (see Fig. 2). Reheating may be accelerated, if desired, by applying a flame, as for example, from a gas burner 29, to the exposed parison at position D.

The subsequent movement of the exposed parison from position D to E, supported only from its neck, has a tendency to cause the parison to bend below its neck as it is stopped at station E, due to the momentum of the body of the parison. Furthermore, the reheating period at position D, particularly if accelerated by the flame 29, may be so effective as to permit the parison to stretch so that the finishing mold will not close around it. In order to correct both of these troubles I provide a paddle or former 30 advantageously operated by a pneumatic motor 31, while the parison is at position D. The upper surface of this paddle is inclined, so that as it strikes the bottom of the parison, it will shorten the length of the parison as well as bend the lower end backward, i. e. contra to its direction of movement toward position E. As the parison is moved from position D to E and is stopped at the latter station, the momentum swings the bottom of the bent parison to substantially upright position.

Synchronously with the movement of the parison from position D to E an open blow mold 12 is moving from position L to E, so that as the parison, supported by the neck rings embracing the neck end is stopped at position E, it is axially over the bottom plate 12ᵃ of the blow mold.

Upon arrival of the blow mold 12 and the exposed parison at station E, the blow mold is closed around the parison by means of a pneumatic motor 32 whose rod acts to close the mold 12 in the usual manner. As the piston rod moves outwardly, a pin 33 at its end engages a valve 34 permitting air to flow through line 34ᵃ to operate the pneumatic motor 35 to open the neck ring 14 from the parison. The parison is now supported wholly by the blow or finishing mold, in which it is moved to position F, the last reheating position.

After the parison has been permitted to reheat at positions D, E and F which correspond in duration to the parison forming time at positions A, B and C, it is ready to be blown to finished form. Preferably the bottle finishing cycle is of duration equal to or greater than the parison forming and reheating cycles and takes place at positions G, H, and I, at which positions the bottle is blown to its finished form by air admitted from two or more blowheads 36 actuated by pneumatic motors 37. In the case of the six blank mold, eight blow mold machine the bottle finishing cycle may be of greater duration than the parison forming or reheating cycles and may be extended to a cooling position J and thence to a takeout station K where the mold is opened by a pneumatic motor 38.

The finished bottle may be removed by any convenient takeout mechanism 39 but I prefer to use the takeout mechanism shown in my Patent No. 2,015,662.

Alternatively, I have illustrated (Figs. 3 and 5) a modified form of machine embodying the invention and which may be provided with an equal number of blank and blow molds, six of each being illustrated herein. The same fabricating devices, as above described, may be provided at the respective parison forming positions A, B, and C.

According to this form of the invention, however, the parison mold may be inverted to upright position during movement from positions A to B, so that the counterblowing of the parison is downwardly. This obviously requires that at stations B and C the blowheads 20 and 24 be above the molds and baffle plates 22 and 26 be below the molds.

This is advantageous because it permits, in the manufacture of certain types of ware, the opening of the blank mold at station C, immediately following the second blowing; and prior to or during indexing movement of that mold away from position C, and this may be effected by means of the cylinder 28 located at station C or by means of a suitable cam, as is common in the art.

This permits of a longer parison reheating time prior to transfer, so that the parison may reheat from positions C to D, and at D and E or F, and the bottles may be blown at F or G, H and I, and removed at position J. According to this form of the invention the reheating burners 29 and the paddle 30 may be provided at station D as in the method described above. For certain types of ware, particularly small ware, this additional parison reheating time before transfer permits of a very high production speed with a relatively small number of sets of molds.

According to one embodiment of the invention such as illustrated in Figs. 1 and 4, the machine advantageously may be pneumatically driven to rotate the mold carriers intermittently, and this may be accomplished by means of a reciprocable pneumatic motor 40, the rod 41 of which is formed as a rack 42 adapted to engage a spur gear 43 splined on shaft 44 provided at its upper end with a pinion 45. The pinion 45 is in mesh with a gear 46 on the blank mold carrier 11 and also with another pinion 47 in mesh with a gear 48 on the blow mold carrier 13 so that the mold carriers 10 and 13 are rotated in opposite directions, i. e. the blank mold carrier rotates counterclockwise and the blow mold carrier rotates clockwise.

The pinion 43 is adapted to be shifted on the shaft 44, being moved upwardly out of engagement with the rack 42 during its idle stroke and downwardly into engagement with the shaft during its actuating stroke by means of a sleeve 49, the lower end of which is formed as a piston 50 which works in a pneumatic cylinder 51. The sleeve also carries arms 52 with table locking pins 53 adapted to lock the table against rotation when the sleeve is raised and the rack 42 and pinion 43 are not in mesh, and to unlock the tables, when the sleeve is lowered and the rack 42 and pinion 43 are in mesh.

A primary valve 54 is provided for controlling the principal air lines leading to the pneumatically actuated fabricating devices of the machine, such as the mouthforming pin cylinder, the various blowhead and baffle plates, the blank and blow mold opening cylinders as well as the blow mold closing cylinders, all of which are preferably actuated upon the stopping of an indexing movement of the tables.

The valve 54 may be of conventional type, arranged to be actuated by the table indexing rack 42 so as to admit main air pressure from port M alternately to lines 55 and 56 at the ends of opposite strokes of the reciprocable rack. Thus at the end of the actuating stroke of the rack 42 the valve is shifted to admit air pressure to line 55 arranged to actuate the various fabricating devices 15, 20, 22, 24, 26, 30 and 36 to move them into engagement with the molds, and also to the cylinders 28, 32 and 38 to open the blank molds and blow molds as well as to close the blow mold. At the end of the idle stroke of the rack 42 the valve 54 is shifted to exhaust the air in line 55 and apply air pressure to line 56 to remove the devices 15, 17, 20, 22, 24, 26, 30 and 36 away from their respective molds. Movement of the former 30 may be delayed as desired by providing suitable cocks in the air lines leading to the motor 31, as is obvious.

Simultaneously air is supplied from line 56 to the pinion shifting cylinder 51 to lower it to bring the pinion 43 into mesh with the rack 42 and unlock the table. A valve casing 57 surrounds one of the table locking pins 53 and cooperates with a port 58 in the pin to admit air to line 59ª which leads to valve 59.

The automatic admission of air to the table rotating motor 40 is controlled by a controlling valve 59, advantageously of the spool type and adapted to be shifted to reverse air into the opposite ends of the motor by air pressure controlled from the lock pin valves 57 and 57ª. After the tables have been indexed and the rack 42 completes its actuating movement and the pin 53 locks the table, air from the feeder timer through line 19 operates the compacting blowhead valve 99 to lower the compacting blow head 17. This same air also passes through line 19ª and lock pin valve 57ª and shifts valve 59 to the right (Fig. 4) to reverse the air to motor 40 moving the rack on its idle stroke. At the end of the idle stroke the rack shifts valve 54 which, among other things, admits air to the top of cylinder 51 to unlock the tables. When the tables are unlocked, the table pin valve 57 admits air to line 59ª to reverse the air to motor and drive the rack on its actuating stroke. Thus the automatic reversal of the motor 40 is controlled from the primary valve 54 through the safety valve 57 insuring completion of the locking or unlocking of the tables, and is automatic on the completion of each reciprocation of the rack 42. The idle stroke of the rack is advantageously a timing stroke, the speed of which may be variably adjusted by checking the exhaust in a conventional manner, so as to vary the production of speed of the machine to suit the particular ware being made.

Certain of the pneumatic devices, such as the blank mold opening motor 28, the blow mold closing motor 32, the neck mold opening cylinder 35, and the blow mold opening motor 38, are moved in their actuating directions at the completion of the indexing movements of the mold carriers and must be reset during the succeeding indexing movement. This may be accomplished by means of a poppet valve 60 adapted to be actuated by a series of cams or buttons 61 on one of the mold carriers, so as to admit air to line 60ª leading to the respective motors 28, 32 and 38 to reset them during the initial portion of the indexing movement. The takeout mechanism 39 is pneumatically operated, as from the line 55 and advantageously is in the form and construction shown in my Patent No. 2,015,662.

Instead of indexing the mold carrier pneumatically as above described, the machine may be motor driven from an electric motor 65 through a variable speed drive 66, transmission 67 to shaft 68 carrying right and left hand worms 69 and 70 respectively. These worms 69—70 are in mesh with worm wheels 71—72 respectively, on Geneva rotors 73—74 engaging slotted Geneva wheels 75—76 respectively, on the columns of the blank and blow mold carriers 11—13. Thus the mold carriers 11—13 are intermittently rotated synchronously in opposite directions.

The timing of the various pneumatic motors for the actuation of the fabricating devices 15, 17, 20, 22, 24, 26, 30 and 36, as well as for operating the mold opening and closing cylinder motors 28, 32 and 38, may be controlled by a timer 80 suitably geared to the transmission 67, so as to rotate continuously and in synchronism with the forming machine and feeding device. The timer 80 is advantageously in the form of a drum provided with a series of circumferential slots 81 in which are adjustably mounted cams or buttons 82 adapted to actuate poppet valves 83 for alternately applying and exhausting air to the respective lines leading to the various pneumatically actuated devices. As illustrated, the upper poppet valve controls air to line 85ª to apply the neck pin, the baffle plates and various blowheads, as well as the mold actuating cylinders 32 and 38. As soon as a charge of glass is delivered into a parison mold at station A, the compacting blowhead 17 is applied by air from the feeder timer 19. At the end of the station operation, this first valve exhausts the air in line 85ª, and another poppet valve admits air to line 85ᵇ to withdraw the various devices from engagement with the molds.

Separate valves may be provided for actuating the paddle motor 31, the resetting of the blank mold opening motor 28, blow mold closing cylinder and neck ring opening cylinder 35, as well as the takeout mechanism. As will be apparent, the cams or buttons 82 must be of desired length to maintain air pressure in the respective lines equivalent to the duration of the various operations controlled by such lines, as will be apparent to those skilled in the art.

Advantages of the invention reside principally in the increased production possible in a standard type of machine using a minimum number of molds. In many instances the production speed of the machine may be increased from 20 to 30 per cent or more.

I claim:

1. A glassware forming machine of the type referred to comprising a parison mold carrier, a plurality of invertible parison molds mounted thereon, means for intermittently moving said carrier to present said parison molds successively to charging, first baffle, second baffle, reheating and transfer stations, means adjacent the charging station for initially shaping a charge of glass in a parison mold, means at the first baffle station adapted to engage opposite ends of the mold for confining the charge therein and for counterblowing the charge to hollow form, separate means at the second baffle station for again confining the charge and again expanding the counterblown charge to set the glass of the thus-formed parison, means for disengaging the parison mold from the parison adjacent the reheating station, means operative following the disengagement of the parison mold from the parison for shortening the length of the parison thus formed, a finishing mold, means for subsequently transferring the parison to the finishing mold, and means for blowing the article to finished form in the finishing mold.

2. A glassware forming machine of the type referred to comprising a parison mold carrier, a plurality of invertible parison molds mounted thereon, means for intermittently moving said carrier to present said parison molds successively to charging, first baffle, and second baffle stations in inverted position, means adjacent the charging station for initially shaping a charge of glass in the inverted parison mold, means at the first baffle station adapted to engage opposite ends of the mold to confine the charge therein and blow it to hollow form, separate means at the second baffle station for again confining the charge in the mold and for again blowing the charge to set the glass thereof, means for inverting the parison to upright position during movement of the molds from the second baffle station to a reheating station, means for opening the parison molds away from the parison at the reheating station, means operative following the opening of the molds for shortening the length of the parison, a finishing mold means for transferring the parison to the finishing mold at a transfer station removed from the reheating station, and means for blowing the parison to final form in the finishing mold.

3. A glassware forming machine as defined in claim 2 characterized by the provision of means for directing a reheating flame against the exposed glass parison after the parison molds have been opened away from the parison and prior to transfer to the finishing mold.

4. The method of shaping hollow glass articles, such as bottles, jars and the like in parison and finishing molds, which comprises compacting a charge of glass in an inverted parison mold, thereafter confining the charge in the parison mold and admitting air pressure to the mouth end thereof to expand the glass charge upwardly in the confined parison mold to counterblow the parison, exposing portions of the counterblown parison to the atmosphere, again confining the parison in the same mold, admitting air pressure to the interior of the blown parison in the thus confined mold to set the glass, disengaging the mold from the glass parison, reheating the parison, moving the parison to a transfer position and transferring it to a finishing mold, and blowing the article to finished form in the finishing mold.

5. The method of shaping hollow glass articles, such as bottles, jars and the like in parison and finishing molds, which comprises compacting a charge of glass in an inverted parison mold, inverting the parison mold and parison, thereafter confining the charge in the parison mold and admitting air pressure to the mouth end thereof to expand the glass charge in the confined parison mold to counterblow the parison, exposing portions of the counterblown parison to the atmosphere, again confining the parison in the same mold, and then admitting air pressure to the interior of the blown parison in the thus confined mold to set the glass, disengaging the mold from the glass parison, reheating the parison, moving the parison to a transfer position and transferring it to a finishing mold, and blowing the article to finished form in the finishing mold.

6. The method of shaping hollow glass articles, such as bottles, jars and the like in parison and finishing molds, which comprises compacting a charge of glass in an inverted parison mold, thereafter confining the charge in the parison mold and admitting air pressure to the mouth end thereof to expand the glass charge upwardly in the confined parison mold to counterblow the parison, exposing portions of the counterblown parison to the atmosphere, again confining the parison in the mold and then admitting air pressure to the interior of the blown parison in the thus confined mold to set the glass, inverting the parison, disengaging the mold from the glass parison, reheating the parison and shortening the length thereof, moving the parison to a transfer position and transferring it to a finishing mold, and blowing the article to finished form in the finishing mold.

EDWARD G. BRIDGES.